United States Patent
Torii

[19]

[11] Patent Number: 6,123,092
[45] Date of Patent: Sep. 26, 2000

[54] ELECTROMAGNETIC SOLENOID VALVE DRIVE CIRCUIT

[75] Inventor: Minoru Torii, Wako, Japan

[73] Assignee: Honda Giken Kogyo Kabushiki Kaisha, Tokyo, Japan

[21] Appl. No.: 09/181,907

[22] Filed: Oct. 29, 1998

[30] Foreign Application Priority Data

Nov. 4, 1997 [JP] Japan .................................. 9-317673
Nov. 4, 1997 [JP] Japan .................................. 9-317674

[51] Int. Cl.$^7$ ...................................................... F16K 31/02
[52] U.S. Cl. ........................... 137/1; 251/129.01; 361/155; 361/187; 361/195
[58] Field of Search .................... 251/129.01, 129.15; 361/154, 155, 156, 194, 195, 196, 187; 137/1

[56] References Cited

U.S. PATENT DOCUMENTS 5,293,551  3/1994  Perkins et al. .................. 251/129.01 X

FOREIGN PATENT DOCUMENTS 7-26701  3/1995  Japan .

Primary Examiner—Kevin Lee
Attorney, Agent, or Firm—Armstrong, Westerman, Hattori, McLeland & Naughton

[57] ABSTRACT

A circuit for driving an electromagnetic solenoid valve, used as a fuel injector in an internal combustion engine, having a needle valve biased in a closing direction by a spring and a solenoid which moves the needle valve in an opening direction when energized to inject fuel into a cylinder of the engine. The circuit includes a first booster which boosts battery voltage to a first voltage to charge a capacitor. The charged voltage is applied to the solenoid for a time period to cause the needle valve to move in the opening direction. The circuit includes a second booster which boosts the battery voltage to a second voltage, less than the first voltage, to be supplied to the solenoid to maintain the first current, enabling the period of large current application to be freely determined to ensure reliable valve operation, whereby the fuel injection can be reliably effected. After the time period has expired, the voltage supply is discontinued, enabling improvement of the valve linearity characteristics, while conserving the energy stored in the battery power source.

21 Claims, 4 Drawing Sheets

ELECTROMAGNETIC SOLENOID VALVE DRIVE CIRCUIT

BACKGROUND OF THE INVENTION

1. Field of the Invention

This invention relates to an electromagnetic solenoid valve drive circuit, particularly to a circuit for driving an electromagnetic solenoid valve to be used, for example, as a fuel injector in the fuel injection system of an internal combustion engine.

2. Description of the Related Art

The fuel injection system of an internal combustion engine usually regulates the quantity of fuel injection by use of an electronic control circuit that controls the opening/closing of an electromagnetic solenoid valve (fuel injector). Specifically, the quantity of fuel injection is regulated by controlling the voltage/current applied to the solenoid (solenoid coil) of the valve so as to control the stroke of the valve needle.

However, the delay in current rise owing to the coil inductance causes a time lag between the time point of voltage application and the time point when the current flowing through the coil reaches the prescribed value. This current rise delay retards the valve response and may deviate the control timing and degrade the accuracy of the fuel injection quantity control.

On the other hand, when the fuel injection system of, for example, a vehicle equipped with a direct-injection gasoline engine uses an electromagnetic solenoid valve type injector to inject fuel under high pressure, the valve must be opened by electromagnetically attracting the needle with a large force sufficient to overcome the high pressure. A large current therefore has to be applied to the solenoid coil at least while the valve needle is under electromagnetic attraction.

As a technology for solving this problem of current rise delay and for enabling application of a large current to a solenoid coil during valve opening, Japanese Patent Publication No. Hei 7(1995)-26,701 teaches a system that enables the current to be rapidly raised to a high level and achieves an improvement of operation response by equipping an electromagnetic solenoid valve drive circuit with a booster for boosting the voltage from an ordinary on-board battery power supply and supplying the boosted high voltage to the solenoid coil at least while the valve is being electromagnetically attracted. In advance of voltage application, the system stores energy in a coil as current, converts the stored energy to a high voltage and stores the high voltage in a capacitor. The energy stored in the capacitor is applied at a high voltage to produce a large current.

With this technology, however, the duration of the high current application to the solenoid coil is determined solely by the energy charged in the capacitor, i.e., by the capacity of the capacitor. Since the amount of energy that can be applied at valve attraction is thereby limited, the fuel injection time and the like cannot be freely determined. A particular problem is that when the fuel pressure is high, for example, the energy available at the time of valve attraction may be insufficient to fully open the valve. This is likely to degrade the control accuracy of the quantity of fuel injected.

Another problem is that the charge voltage of the capacitor used as the high-voltage storage means is difficult to control because its capacitance varies markedly with temperature change and aging.

An object of the invention is therefore to overcome the foregoing problems by providing an electromagnetic solenoid valve drive circuit enabling the period of large current application to be freely determined to ensure reliable valve operation, whereby, when the valve drive circuit is used as a fuel injector in a fuel injection system of an internal combustion engine, for example, the fuel injection can be reliably effected.

Moreover, the prior art is disadvantageous in that the fall of the current from the peak value to attract the needle valve to open to a lower value to keep the valve open takes a long time, rendering the current fall characteristics unsatisfactory. Since the linearity characteristics of the electromagnetic solenoid valve are determined by the characteristics of the current fall, when the valve is used as a fuel injector, the dynamic range of the valve is limited. This problem is serious under a high engine speed, since the valve operation period from opening to closing should necessarily be shortened.

Furthermore, after the valve has been completely attracted, the supply of further current is simply a waste of the energy stored in the battery power source.

Another object of the invention is therefore to overcome the foregoing problems by providing an electromagnetic solenoid valve driver circuit which enables improvement of the valve linearity characteristics, while conserving the energy stored in the battery power source, whereby, for example, the valve drive circuit is advantageously used in a fuel injection system of an internal combustion engine.

SUMMARY OF THE INVENTION

In order to achieve the objects, there is provided in the first aspect of the invention, a circuit for driving an electromagnetic solenoid valve having a needle valve biased in a closing direction by a spring and a solenoid which moves the needle valve in an opening direction when supplied with current from a power source and energized; comprising: first voltage generating means for generating a first voltage to be supplied to the solenoid such that a first current flows to the solenoid to cause the needle valve to move in the opening direction; second voltage generating means for generating a second voltage, less than the first voltage, to be supplied to the solenoid to maintain the first current; constant current generating means for generating a constant current to be supplied to the solenoid to keep the valve open; and control means for controlling supply of the first voltage, the second voltage and the constant current to the solenoid.

There is provided in the second aspect of the invention, a circuit for driving an electromagnetic solenoid valve having a needle valve biased in a closing direction by a spring and a solenoid which moves the needle valve in an opening direction when supplied with current from a power source and energized; comprising: voltage supplying means for supplying a voltage to the solenoid for a time such that a first current flows to the solenoid to cause the needle valve to move in the opening direction; constant current supplying means for supplying a constant second current to the solenoid to keep the valve open; and current supply discontinuing means for discontinuing the supply of the voltage to the solenoid after the time has lapsed.

BRIEF EXPLANATION OF DRAWINGS

This and other objects and advantages of the invention will be more apparent from the following description and drawings, in which.

DETAILED DESCRIPTION OF THE PREFERRED EMBODIMENT

An embodiment of the invention will now be explained with reference to the attached drawings.

Figure 1:
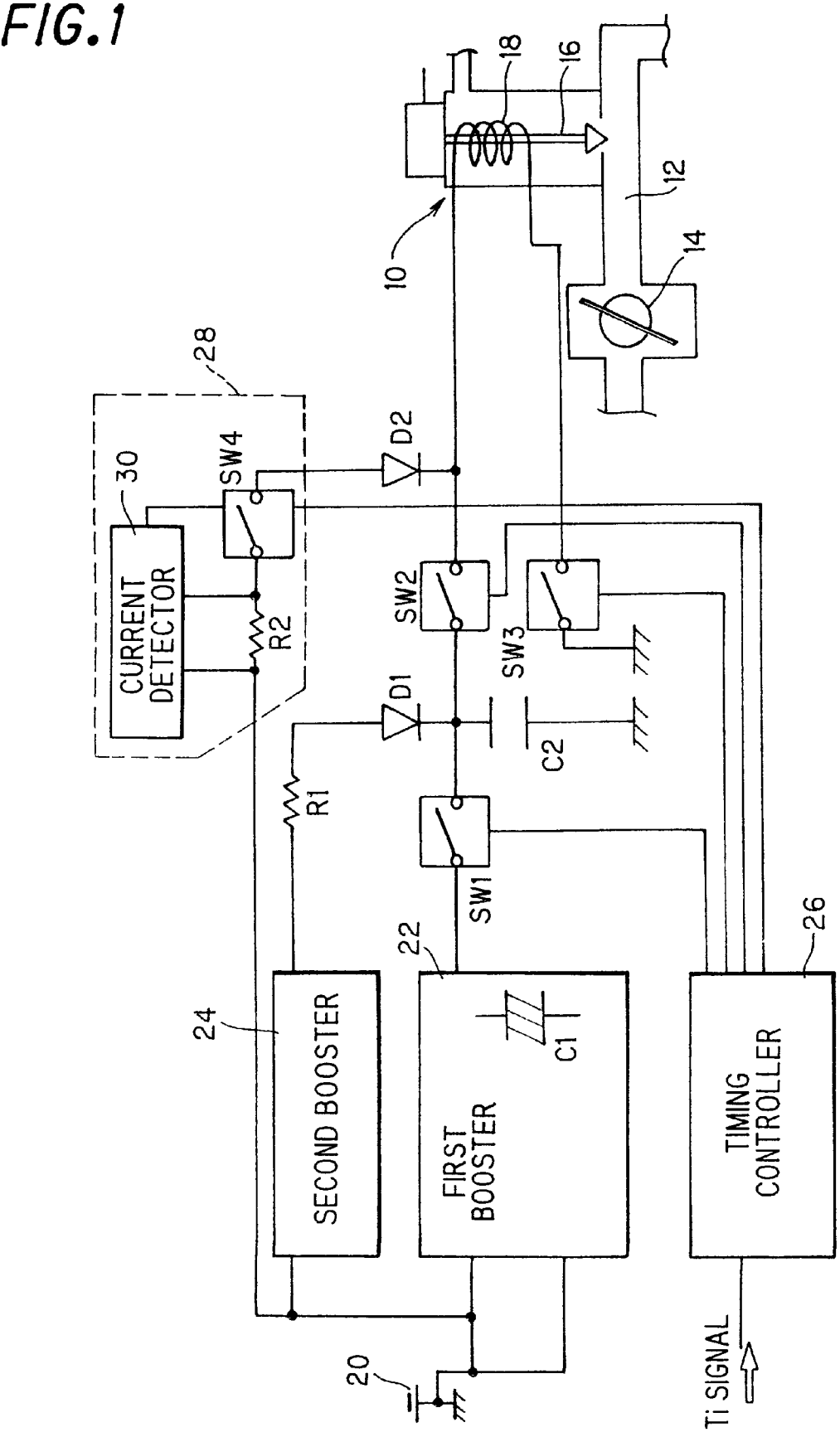
FIG. 1 is a block diagram showing the configuration of an electromagnetic solenoid valve drive circuit according to the invention applied as a fuel injector used in an internal combustion engine fuel injection system.

FIG. 1 is a block diagram of an electromagnetic solenoid valve drive circuit according to the invention as applied as a fuel injector in a fuel injection system of an internal combustion engine.

Reference numeral 10 in this figure designates an electromagnetic solenoid valve (fuel injector). Air drawn into an air intake pipe 12 through an air cleaner (not shown) mounted on its far end is supplied to the combustion chambers of multiple cylinders (not shown) through a surge tank (not shown), an intake manifold (not shown) and intake valves (not shown), while the flow thereof is adjusted by a throttle valve 14. The electromagnetic solenoid valve 10 for injecting fuel is installed in the vicinity of the intake valve of each cylinder. The injected fuel mixes with the intake air to form an air-fuel mixture that is ignited in the associated cylinder by a spark plug (not shown). The resulting combustion of the air-fuel mixture drives down a piston (not shown).

The electromagnetic solenoid valve 10 includes a needle (valve) 16 biased in the valve closing direction by a spring (not shown) and a solenoid coil 18 disposed near the needle 16. The solenoid (coil) 18 is connected to an electromagnetic solenoid valve drive circuit and an ECU (electronic control unit; not shown in the drawings). It is energized/deenergized in response to the output signal (fuel injection signal) of the ECU to attract (retract) or move the needle 16 in the valve opening direction to effect fuel injection.

The electromagnetic solenoid valve drive circuit is connected to an onboard battery power supply 20 and is equipped with a first booster 22 for producing a high voltage exceeding the on-board battery power supply voltage, a capacitor C1 that stores the high voltage, a second booster 24 also for producing a high voltage and a capacitor C2 that stores electrical energy for applying a high voltage to the solenoid coil 18.

One terminal of the capacitor C2 is connected to ground. The other terminal thereof is connected through a connection point and a switch SW1 to the capacitor C1, through a diode D1 and a resistor R1 to the second booster 24, and through a switch SW2 to one end of the solenoid coil 18. The other end of the solenoid coil 18 is connected through a switch SW3 to ground.

The switch SW1 is an electrical switching means for enabling transfer of a first high voltage/charge stored in the capacitor C1 to the capacitor C2 at a time when voltage is not being applied to the solenoid valve 10. The switch SW2 is an electrical high-side switch for enabling application of the energy charged in the capacitor C2 to the solenoid coil 18 during electromagnetic attraction of the solenoid valve. The switch SW3 is an electrical low-side switch for this application and for discharging the valve current.

Opening/closing of the electrical switches SW1, SW2 and SW3 is controlled by a timing controller 26 in response to a control signal (Ti signal) from the ECU.

The high side of the solenoid coil 18 is connected through a diode D2 and a constant current detection circuit 28 to the on-board battery power supply 20. The constant current detection circuit 28 comprises a resistor R2, a current detector 30 for detecting the current flowing through the resistor R2, and an electrical switch SW4.

Based on the value of the current passing through the resistor R2 detected by the current detector 30, the timing controller 26 drives the switch SW4 in duty-ratio control (in Pulse Width Modulation) to keep the current passing through the solenoid coil 18 substantially constant.

The operation of the illustrated electromagnetic solenoid valve drive circuit will now be explained with reference to the time chart of FIG. 2.

Before receiving the Ti signal from the ECU (during period A in FIG. 2), the timing controller 26 keeps the switch SW1 constantly closed (ON).

During period A, therefore, the high voltage to the capacitor C1 charged by the first booster 22 is applied to the capacitor C2 through the closed switch SW1 and charges the capacitor C2.

The first booster 22 charges the capacitor C1 to a high voltage by the well-known switching technique. Specifically, current passing from the battery power supply 20 through a coil (not shown) in the first booster 22 is turned ON-OFF (switched) by applying pulses to a transistor (not shown) and the high voltage shelf 10 induced in the coil when the current is turned off, is repeatedly applied to the capacitor C2.

In this embodiment, the capacitor C2 can be charged to 150 V (the first prescribed voltage) and has a capacitance sufficient to effect the initial valve attraction.

The second booster 24 similarly utilizes a coil (not shown) to boost the on-board battery power supply voltage to a high voltage. In this embodiment, the second booster 24 generates 70 V (the second prescribed voltage).

Period A is made sufficiently long to enable the capacitor C2 to be charged to the voltage of the first booster (150 V).

At the end of period A (time point B in FIG. 2), the switch SW1 is turned OFF and the switches SW2 and SW3 are turned ON to apply the high voltage stored in the capacitor C2 (first prescribed voltage) to the solenoid coil 18. Since the capacitor C2 has been charged to the aforesaid high voltage (first prescribed voltage), the injector current (current flowing through the solenoid coil 18) can be rapidly increased.

Figure 2:
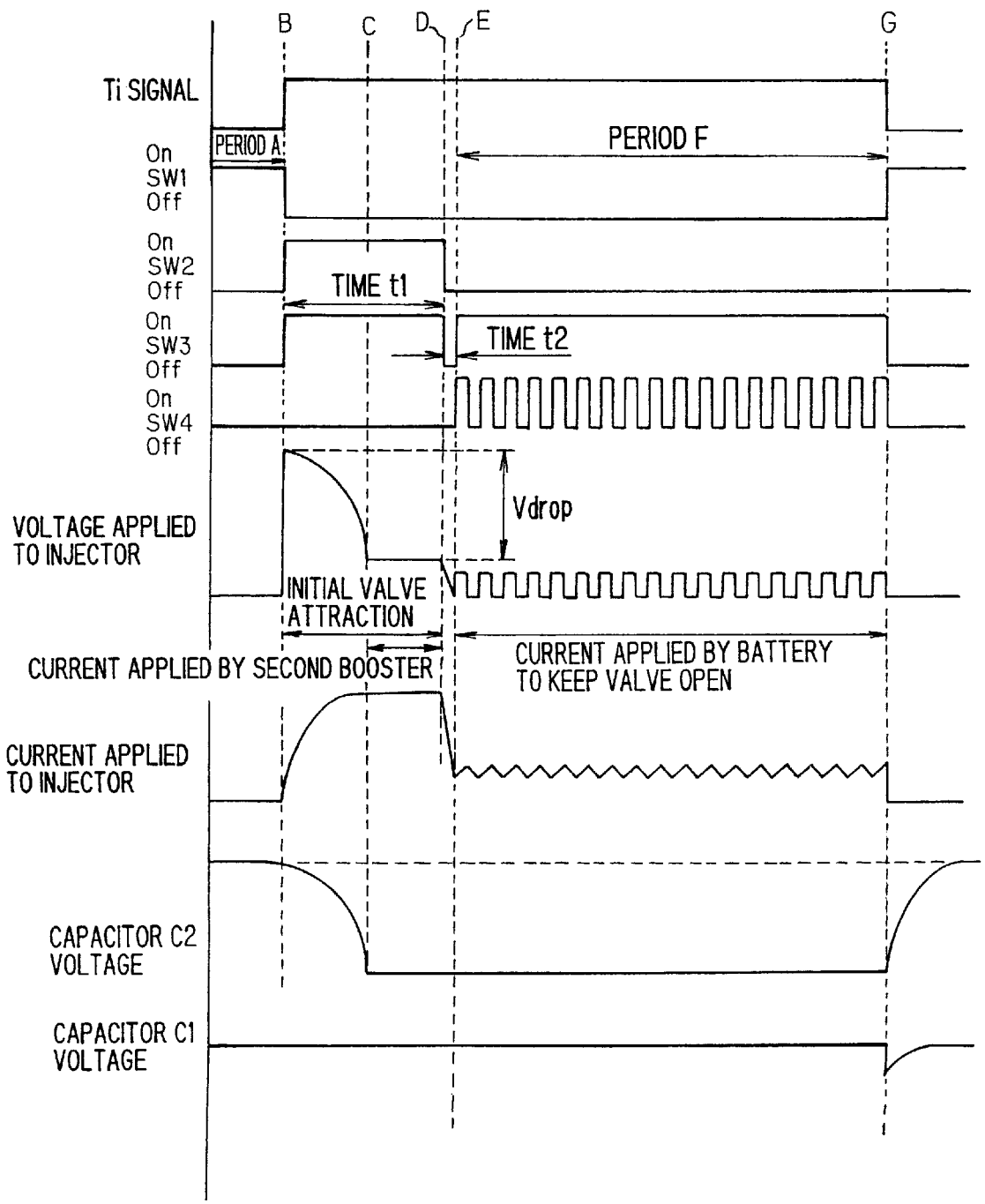
FIG. 2 is a time chart showing the operation of the electromagnetic solenoid drive circuit illustrated in FIG. 1.

The voltage charge in the capacitor C2 decreases with progressive discharge through the solenoid coil 18 and eventually falls to the output voltage of the second booster 24 (70 V) at time point C in FIG. 2. Owing to the circuit configuration shown in FIG. 1, voltage is thereafter applied to the solenoid coil 18 by the second booster 24. Supply of a large current to the solenoid coil 18 can therefore be continued through the resistor R1 and the diode D1.

The second booster voltage (second prescribed voltage) is determined beforehand to the minimum value necessary for maintaining the current at the high level to which it was boosted by the first booster 22.

By the foregoing arrangement, the period (time t1 in FIG. 2) over which a large current is applied to the solenoid coil can be freely set to achieve complete electromagnetic attraction of the valve. The time t1 during which the valve fully opens from the completely closed state is called the "initial valve attraction (movement) period" and the valve attraction during this period is called the "initial valve attraction (movement)."

Figure 3:
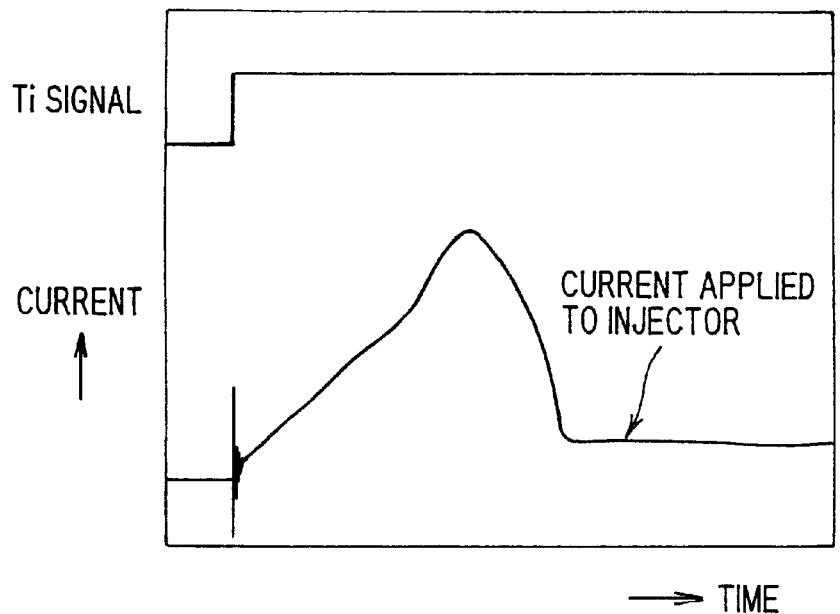
FIG. 3 is a time chart showing the pattern of injector current change when voltage/current is applied to the solenoid in a prior art electromagnetic solenoid valve drive circuit.

The graph or time chart of FIG. 3 shows the pattern of injector current change when a conventional drive circuit not equipped with the second booster 24 is used to apply voltage/current to the solenoid of the valve 10.

The current rises rapidly owing to the application of high voltage, and application of large current, particularly of current near peak value, is maintained only for a short period. Although this period can be prolonged to some extent by increasing the capacitance of the capacitor, this does not alter the fact that the large current application period is totally dependent on the capacitor capacitance. The conventional drive circuit is also disadvantageous in the point of control accuracy because the capacitance of the capacitor changes greatly with temperature change and aging.

Figure 4:
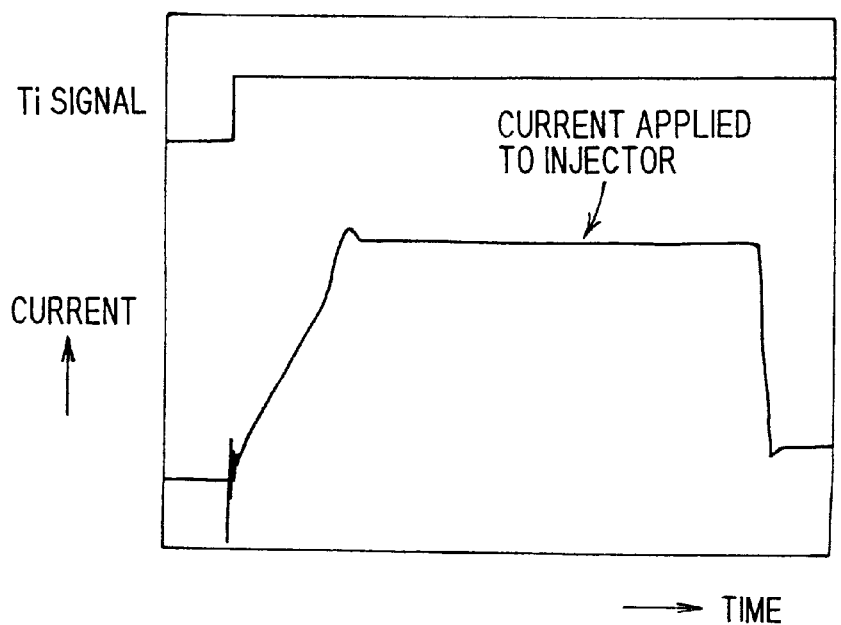
FIG. 4 is a view, similar to FIG. 3, in which voltage/current is applied to the solenoid in the electromagnetic solenoid valve circuit illustrated in FIG. 1 such that a prescribed initial value attraction period is set using a second booster in the circuit.

FIG. 4 is a graph or time chart similar to that of FIG. 3 showing the pattern of injector current change when the drive circuit of FIG. 1 according to the invention is utilized and a prescribed initial valve attraction period is freely determined using the second booster 24.

This drive circuit not only achieves a rapid increase in the injector current but, as is clear from a comparison with FIG. 3, also stably maintains a large applied current for a markedly longer period than does the conventional drive circuit.

Specifically, in this drive circuit the first booster 22 quickly boosts the applied current to a high level, and this high-level current is thereafter maintained for the desired period by the second booster 24.

The electromagnetic solenoid valve drive circuit according to the invention can therefore eliminate the problem of incomplete valve attraction owing to insufficient energy encountered by the prior art and thus ensure reliable valve attraction and enhanced control accuracy.

Returning to the explanation of FIG. 2, at time point D in the time chart, the switches SW2 and SW3 are simultaneously turned OFF for a prescribed short time period, more precisely, momentarily, to terminate the initial valve attraction. (Alternatively, the switch SW2 can be turned off before the switch SW3.)

While the switches SW2 and SW3 are OFF (during time t2 in FIG. 2), no current is supplied from the high side. Moreover, since the switch SW3 on the current receiving side (ground) is also OFF, the injector current falls sharply. The period required for the current to fall from the high level at valve attraction to the current level for holding the valve open (on-board battery power supply current) can therefore be markedly shortened.

Figure 5:
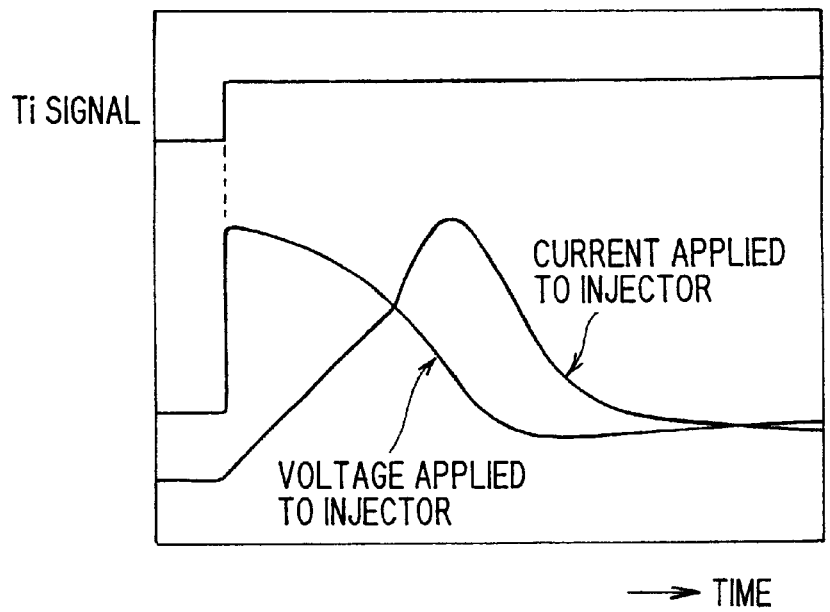
FIG. 5 is a time chart showing the pattern of injector current change when current cutoff is not effected.

The graph of FIG. 5 shows the pattern of injector current change in which current cutoff is not effected. Here, the fall of the current from the peak value to the open valve hold level follows a gradual curve and takes a long time.

This current fall time is determined solely by the capacitance of the capacitor, the voltage and the inductance of the solenoid coil, which is to say that the dynamic range of the electromagnetic solenoid valve is determined by the properties or characteristics of the capacitor and the solenoid coil. The current fall time tends to become particularly long when a large current is applied.

After the (needle) valve has been completely attracted by supplying sufficient valve attraction energy, the supply of further current is simply a waste of energy.

In the illustrated embodiment, therefore, the solenoid coil 18 and the current path (having switches SW2, SW3) for supplying current from the voltage sources (the capacitor C2, the first and second boosters 22 and 24, and the on-board battery power supply 20) to the solenoid coil 18 is completely cut off upon termination of the initial current application (time point D) so as to rapidly lower the current applied to the solenoid.

Figure 6:
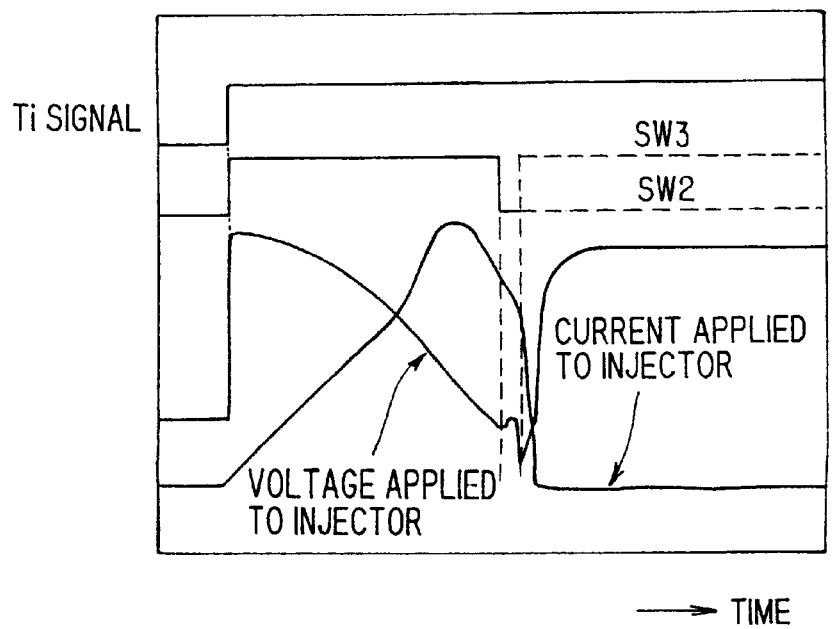
FIG. 6 is a view, similar to FIG. 5, in which the current cutoff is effected upon termination of the initial current application in the circuit illustrated in FIG. 1.

FIG. 6 is a graph similar to that of FIG. 5 showing the pattern of injector current change when current shutoff is effected upon termination of the initial current application. A comparison of FIG. 6 with FIG. 5 shows that the injector current instantaneously falls to the open valve hold level at current shutoff.

Specifically, shutting the current off by opening the switches SW2 and SW3 shortens the current fall time from 130 μsec to 10 μsec, meaning a 120 μsec improvement (time reduction) in the linearity characteristic of the solenoid valve.

This current shutoff further makes it possible to stop supply of current to the solenoid coil 18 in excess of the required valve attraction energy. It therefore helps to conserve the energy of the battery power supply 20.

It should be noted here that the same result will also be attained in the prior art drive circuit having no second booster. If the current supply is shut off even in the prior circuit, the injector current would instantaneously fall to the minimum value necessary for keeping the valve open.

At time point E in the timing chart of FIG. 2, the switches SW3 and SW4 are turned ON to hold the valve open for a prescribed time period. During this period, the on-board battery power supply applies voltage/current to the solenoid coil 18 through the resistor R2 and the diode D2. The current detector 30 detects the value of the current flowing through the resistor R2 and, based on the detected value, the ECU causes the timing controller 26 to ON-OFF control the switch SW4 so as to keep a substantially constant current (open valve hold current) flowing through the solenoid coil (during period F in FIG. 2).

Then, at time point G (Ti signal termination point), the switches SW3 and SW4 are turned OFF to terminate application of the open valve hold current and allow the electromagnetic solenoid valve to close under the force of the biasing spring. At the same time, the switch SW1 is turned ON to again charge the capacitor C2 with high voltage in preparation for the next valve opening operation.

Thus, the electromagnetic solenoid valve drive circuit is configured to include the second booster 24, which, by generating and applying the minimum voltage needed to maintain the large current (determined solely by the capacitor), enables the period of large current application to the solenoid valve 10 to be freely changed, thereby ensuring reliable valve operation. Therefore, when the electromagnetic solenoid valve drive circuit is used in a fuel injection system, for example, the fuel injection can be reliably effected.

Since the voltage of the capacitor C2 never falls below the voltage of the second booster 24, the first booster 22 is only required to increase the voltage of the capacitor C2 by the amount of the voltage Vdrop indicated in FIG. 2 (i.e., 50 V). This enables the capacitor C2 to be rapidly charged and also saves energy.

Since there is no switchover point between the voltage application by the second booster 24 and the voltage application by the capacitor C2, the current does not change suddenly to produce radio noise.

Since the durability of a capacitor is ordinarily affected strongly by voltage change rate, the service life of the capacitors C1 and C2 can be prolonged.

As stated above, the embodiment is configured to have a circuit for driving an electromagnetic solenoid valve 10 having a needle valve 16 biased in a closing direction by a spring and a solenoid (coil) 18 which moves the needle valve in an opening direction when supplied with current from a power source and energized; comprising: first voltage generating means (the first booster 22, the capacitor C2) for generating a first voltage (the first prescribed voltage, e.g., 150 V) to be supplied to the solenoid 18 such that a first current flows to the solenoid 18 to cause the needle valve to move in the opening direction; second voltage generating means (the second booster 24) for generating a second voltage (the second prescribed voltage, e.g., 70 V), less than the first voltage, to be supplied to the solenoid to maintain the first current; constant current generating means (the constant current detection circuit 28) for generating a constant current to be supplied to the solenoid 18 to keep the valve open; and control means (timing controller 26, SW1, SW2, SW3, SW4) for controlling supply of the first voltage, the second voltage and the constant current to the solenoid.

In the circuit, the first voltage generating means includes a capacitor C2 and a first booster 22 which boosts a battery voltage to the first voltage such that the capacitor is charged with the first voltage. The control means has a first switch (SW2) provided in a current path and a timing controller 26 which turns on the first switch such that the capacitor C2 discharges the first voltage in order that the first current flows to the solenoid. The second voltage generating means includes a second booster 24 which boosts the battery voltage to the second voltage.

In the circuit, the timing controller 26 turns on the first switch (SW2) such that the second voltage is supplied to the solenoid. The control means has a first switch (SW2) and a second switch (SW3) provided in a current path and a timing controller 26 which turns on the first and second switches such that the capacitor discharges the first voltage in order that the first current flows to the solenoid. The control means has a first switch (SW2) and a second switch (SW3) provided in a current path and a timing controller which turns on the first and second switches such that second voltage is supplied to the solenoid.

In the circuit, the timing controller 26 turns off the first switch to discontinue the supply of the first current to the solenoid after a time period (time t1) has lapsed. The timing controller turns off the first and second switches to discontinue the supply of the first current to the solenoid after a time period (time t1) has lapsed. The timing controller turns off the first and second switches simultaneously. The timing controller turns off the second switch after turning off the first switch.

In the circuit, the constant current generating means (the constant current detection circuit 28) is connected to the current path downstream of the first switch (SW2) such that the constant current is supplied to the solenoid. The constant current generating means is connected to the current path downstream of the first switch such that the constant current is supplied to the solenoid. The constant current generating means is connected to the current path downstream of the first and upstream of the second switches such that the constant current is supplied to the solenoid. The constant current generating means is connected to the current path downstream of the first and upstream of the second switches such that the constant current is supplied to the solenoid.

As stated above, the embodiment is also configured to have a circuit for driving an electromagnetic solenoid valve 10 having a needle valve 16 biased in a closing direction by a spring and a solenoid (coil) 18 which moves the needle valve 16 in an opening direction when supplied with current from a power source and energized; comprising: voltage supplying means (the first booster 22, the capacitor C2 and the second booster 24) for supplying a voltage to the solenoid 18 for a time t1 such that a first current flows to the solenoid 18 to cause the needle valve to move in the opening direction; constant current supplying means (the constant current detection circuit 28) for supplying a constant second current to the solenoid 18 to keep the valve open; and current supply discontinuing means (the timing controller 26, SW2, SW3) for discontinuing the supply of the voltage to the solenoid after the time t1 has lapsed.

The circuit further includes a first switch (SW2) provided in a first path along which the first current flows to the solenoid 18 and wherein the current supply discontinuing means turns off the first switch (SW2) after the time t1 has lapsed. The circuit further includes a second switch (SW3) provided in a second path connected to the first path to ground along which the first current and the constant second current flows and wherein the current supply discontinuing means turns off the first and second switches (SW2, SW3) after the time t1 has lapsed. The current supply discontinuing means turns off the first and second switches (SW2, SW3) simultaneously. The current supply discontinuing means turns off the second switch (SW3) after turning off the first switch (SW2). The current supplying discontinuing means discontinues the supply of the voltage to the solenoid 18 for a short time period t2 after the time t1 has lapsed.

Although the electromagnetic solenoid valve drive circuit according to the invention has been explained taking application to the fuel injector in the fuel injection system of an internal combustion engine as an example, the electromagnetic solenoid valve drive circuit of the invention is not limited to this application.

Although the invention has thus been shown and described with reference to specific embodiments, it should be noted that the invention is in no way limited to the details of the described arrangements but changes and modifications may be made without departing from the scope of the invention which is defined by the appended claims.

What is claimed is:

1. A circuit for driving an electromagnetic solenoid valve having a needle valve biased in a closing direction by a spring and a solenoid which moves the needle valve in an opening direction when supplied with current from a power source and energized; comprising:

first voltage generating means for generating a first voltage to be supplied to the solenoid such that a first current flows to the solenoid to cause the needle valve to move in the opening direction;

second voltage generating means for generating a second voltage, less than the first voltage, to be supplied to the solenoid to maintain the first current;

constant current generating means for generating a constant current to be supplied to the solenoid to keep the valve open; and control means for controlling supply of the first voltage, the second voltage and the constant current to the solenoid.

2. A circuit according to claim 1, wherein the first voltage generating means includes a capacitor and a first booster which boosts a battery voltage to the first voltage such that the capacitor is charged with the first voltage.

3. A circuit according to claim 2, wherein the control means has a first switch provided in a current path and a timing controller which turns on the first switch such that the capacitor discharges the first voltage in order that the first current flows to the solenoid.

4. A circuit according to claim 3, wherein the second voltage generating means includes a second booster which boosts the battery voltage to the second voltage.

5. A circuit according to claim 4, wherein the timing controller turns on the first switch such that the second voltage is supplied to the solenoid.

6. A circuit according to claim 2, wherein the control means has a first switch and a second switch provided in a current path and a timing controller which turns on the first and second switches such that the capacitor discharges the first voltage in order that the first current flows to the solenoid.

7. A circuit according to claim 4, wherein the control means has a first switch and a second switch provided in a current path and a timing controller which turns on the first and second switches such that second voltage is supplied to the solenoid.

8. A circuit according to claim 3, wherein the timing controller turns off the first switch to discontinue the supply of the first current to the solenoid after a time period has lapsed.

9. A circuit according to claim 6, wherein the timing controller turns off the first and second switches to discontinue the supply of the first current to the solenoid after a time period has lapsed .

10. A circuit according to claim 9, wherein the timing controller turns off the first and second switches simultaneously.

11. A circuit according to claim 9, wherein the timing controller turns off the second switch after turning off the first switch.

12. A circuit according to claim 3, wherein the constant current generating means is connected to the current path downstream of the first switch such that the constant current is supplied to the solenoid.

13. A circuit according to claim 5, wherein the constant current generating means is connected to the current path downstream of the first switch such that the constant current is supplied to the solenoid.

14. A circuit according to claim 6, wherein the constant current generating means is connected to the current path downstream of the first and upstream of the second switches such that the constant current is supplied to the solenoid.

15. A circuit according to claim 7, wherein the constant current generating means is connected to the current path downstream of the first and upstream of the second switches such that the constant current is supplied to the solenoid.

16. A circuit for driving an electromagnetic solenoid valve having a needle valve biased in a closing direction by a spring and a solenoid which moves the needle valve in an opening direction when supplied with current from a power source and energized; comprising:

voltage supplying means for supplying a voltage to the solenoid for a time such that a first current flows to the solenoid to cause the needle valve to move in the opening direction;

constant current supplying means for supplying a constant second current to the solenoid to keep the valve open;

current supply discontinuing means for discontinuing the supply of the voltage to the solenoid after the time has lapsed;

a first switch provided in a first path along with the first current flows to the solenoid; and a second switch provided in a second path connected to the first path to ground along which the first current and the constant second current flow;

wherein the current supply discontinuing means turns off the first and second switches after the time has lapsed.

17. A circuit according to claim 16, wherein the current supply discontinuing means turns off the first and second switches simultaneously.

18. A circuit according to claim 16, wherein the current supply discontinuing means turn off the second switch after turning off the first switch.

19. A circuit according to claim 16, wherein the current supplying discontinuing means discontinues the supply of the voltage to the solenoid for a short time period after the time has lapsed.

20. A method of driving an electromagnetic solenoid valve having a needle valve biased in a closing direction by a spring and a solenoid which moves the needle valve in an opening direction when supplied with current from a power source and energized; comprising the steps of:

generating a first voltage to be supplied to the solenoid such that a first current flows to the solenoid to cause the needle valve to move in the opening direction;

generating a second voltage, less than the first voltage to be supplied to the solenoid to maintain the first current;

generating a constant current to be supplied to the solenoid to keep the valve open; and controlling supply of the first voltage, the second voltage and the constant current to the solenoid.

21. A method of driving an electromagnetic solenoid valve having a needle valve biased in a closing direction by a spring and a solenoid which moves the needle valve in an opening direction when supplied with current from a power source and energized; comprising the steps of:

supplying a voltage to the solenoid for a time such that a first current flows to the solenoid to cause the needle valve to move in the opening direction;

supplying a constant second current to the solenoid to keep the valve open; and discontinuing the supply of the voltage to the solenoid after the time has lapsed by turning off a first switch provided in a first path along which the first current flows to the solenoid and a second switch provided in a second path connected to the first path to ground along which the first current and the constant second current flow.

* * * * *